United States Patent
Widlinski et al.

(10) Patent No.: US 10,071,755 B2
(45) Date of Patent: Sep. 11, 2018

(54) HOUSING DEVICE FOR A MAGNET BODY FOR AN ELECTROMAGNETIC OR PERMANENTLY MAGNETIC RAIL BRAKE FOR A RAIL VEHICLE AND ELECTROMAGNETIC OR PERMANENTLY MAGNETIC RAIL BRAKE FOR A RAIL VEHICLE

(71) Applicant: KNORR-BREMSE GESELLSCHAFT MIT BESCHRÄNKTER HAFTUNG, Mödling (AT)

(72) Inventors: Marcin Widlinski, Vienna (AT); Richard Rathammer, Stillfried-Grub (AT); Volker Joergl, Breitenfurt (AT)

(73) Assignee: KNORR-BREMSE GESELLSCHAFT MIT BESCHRANKTER HAFTUNG, Mödling (AT)

( * ) Notice: Subject to any disclaimer, the term of this patent is extended or adjusted under 35 U.S.C. 154(b) by 73 days.

(21) Appl. No.: 15/126,926

(22) PCT Filed: Mar. 16, 2015

(86) PCT No.: PCT/EP2015/055406
§ 371 (c)(1),
(2) Date: Sep. 16, 2016

(87) PCT Pub. No.: WO2015/140095
PCT Pub. Date: Sep. 24, 2015

(65) Prior Publication Data
US 2017/0096151 A1    Apr. 6, 2017

(30) Foreign Application Priority Data
Mar. 17, 2014    (DE) .................. 10 2014 103 627

(51) Int. Cl.
*B61H 7/08* (2006.01)
*F16D 65/02* (2006.01)
*F16D 63/00* (2006.01)

(52) U.S. Cl.
CPC ............ *B61H 7/08* (2013.01); *F16D 63/002* (2013.01); *F16D 65/02* (2013.01)

(58) Field of Classification Search
CPC ......... B61H 7/08; B61H 7/086; F16D 63/002; F16D 65/02; B60L 13/04; B60L 13/10;
(Continued)

(56) References Cited

U.S. PATENT DOCUMENTS

| 7,806,242 B2 | 10/2010 | Lehmann et al. | |
| 2004/0079597 A1* | 4/2004 | Schmied | B61H 7/086 188/73.37 |
| 2007/0284199 A1* | 12/2007 | Lehmann | B61H 7/086 188/165 |

FOREIGN PATENT DOCUMENTS

| CN | 1953893 A | 4/2007 |
| CN | 101317317 A | 12/2008 |

(Continued)

OTHER PUBLICATIONS

Search report for International Patent Application No. PCT/EP2015055406, dated Dec. 17, 2015.
(Continued)

*Primary Examiner* — Robert A. Siconolfi
*Assistant Examiner* — San M Aung
(74) *Attorney, Agent, or Firm* — Barnes & Thornburg LLP

(57) ABSTRACT

The disclosed embodiments relate to a housing device for a magnet body for an electromagnetic rail brake for a rail vehicle. The housing device has a first cable feed-through opening for the feeding through of a first electrical connec-
(Continued)

tion cable into the magnet body. The housing device is characterized in that a first axial-extent axis of the first cable feed-through opening is arranged at an acute inclination angle to a main surface of the housing device adjacent to the first cable feed-through opening, wherein the first cable feed-through opening is arranged in the center of the rail brake within a tolerance range.

11 Claims, 2 Drawing Sheets

(58) Field of Classification Search
CPC ........ B60L 2200/26; B60L 7/28; B61B 13/08; B61K 7/02; B61K 7/04; B61K 7/06; B61K 7/08; B61K 7/12; H02K 49/04; H02K 41/025
USPC .......... 188/62, 165, 73.37; 105/77; 104/281, 104/282, 283, 284, 285, 286
See application file for complete search history.

(56) References Cited

FOREIGN PATENT DOCUMENTS

| | | | |
|---|---|---|---|
| CN | 102149588 A | | 8/2011 |
| CN | 102991528 | * | 3/2013 |
| DE | 2720811 | * | 11/1978 |
| DE | 102004018010 | | 10/2005 |
| EP | 1177962 A3 | | 2/2003 |
| EP | 2 331 380 B1 | | 7/2016 |
| JP | H03197271 A | | 8/1991 |
| WO | 2010038910 A2 | | 4/2010 |

OTHER PUBLICATIONS

Chinese Office Action for corresponding Chinese Application 2015800196950 dated Nov. 3, 2017.

* cited by examiner

HOUSING DEVICE FOR A MAGNET BODY FOR AN ELECTROMAGNETIC OR PERMANENTLY MAGNETIC RAIL BRAKE FOR A RAIL VEHICLE AND ELECTROMAGNETIC OR PERMANENTLY MAGNETIC RAIL BRAKE FOR A RAIL VEHICLE

PRIORITY CLAIM

This patent application is a U.S. National Phase of International Patent Application No. PCT/EP2015/055406, filed 16 Mar. 2015, which claims priority to German Patent Application No. 10 2014 103 627.1, filed 17 Mar. 2015 the disclosure of which are incorporated herein by reference in their entirety.

FIELD

Disclosed embodiments relate to a housing device for a magnet body for an electromagnetic or permanently magnetic rail brake for a rail vehicle, and to an electromagnetic or permanently magnetic rail brake for a rail vehicle.

BACKGROUND

Disclosed embodiments to provide an improved housing device for a magnet body for a rail brake for a rail vehicle, and an improved rail brake for a rail vehicle.

SUMMARY

Disclosed embodiments utilize a housing device for a magnet body for an electromagnetic or permanently magnetic rail brake for a rail vehicle, and an electromagnetic or permanently magnetic rail brake for a rail vehicle.

BRIEF DESCRIPTION OF THE FIGURES

Disclosed embodiments are explained more specifically below with reference to the accompanying drawings, in which.

DETAILED DESCRIPTION

Figure 1:
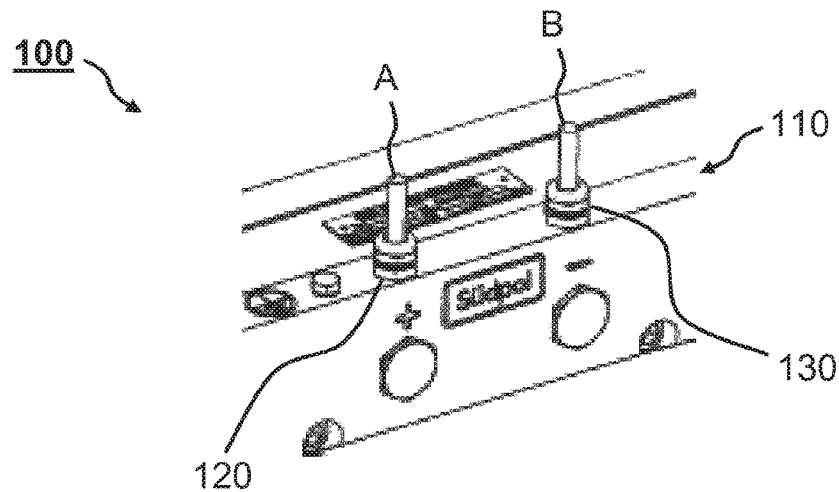
FIGS. 1 to 3 show illustrations of housing devices for a magnet body for an electromagnetic or permanently magnetic rail brake.

Disclosed embodiments utilize a housing device for a magnet body for an electromagnetic or permanently magnetic rail brake for a rail vehicle, and an electromagnetic or permanently magnetic rail brake for a rail vehicle.

According to at least one disclosed embodiments, an integral cable connector with entry of connector cables in an oblique position through a housing directly into a magnet body of an electromagnetic or permanently magnetic rail brake can be provided, in particular. Here, for example, a cable passage axis of a cable through the housing can be arranged at an acute angle with regard to an adjacent main surface of the housing, instead of lying parallel to or on an axis with respect to a further cable passage axis of a further cable or at a right angle with regard to an adjacent main surface of the housing.

In particular, an embodiment of a cable outlet which saves installation space and can be realized such that it is protected within the wheel track of the rail vehicle can advantageously be provided in an integral design without additional components. A tendency toward standing water in the cable connector can also be prevented by way of an oblique position of the cable passages through the housing. The oblique position of the cable introduction can make an optimization possible between mechanical feasibility and minimization of the installation space. For example, components such as sealing elements and cables can be arranged as far as possible within a magnet cross-sectional shadow. Greater flexibility in relation to the installation space requirements of the rail brake, in particular at the end of the rail brake, can be achieved specifically by way of the central arrangement of the cable leadthrough. As a result, for example, an extension of the rail brake in the direction of the suspension means of the rail brake can be achieved, which extension leads to a greater braking action of the rail brake which is opened up by way of the installation of a larger magnet in the rail brake.

The disclosed embodiments provide a housing device for a magnet body for an electromagnetic rail brake for a rail vehicle, the housing device having a first cable through opening for leading through a first electrical connector cable into the magnet body, distinguished by the fact that a first axial extent axis of the first cable through opening is arranged at an acute inclination angle with regard to a main surface of the housing device which is adjacent with respect to the first cable through opening, the first cable through opening being arranged in the center of the rail brake within a tolerance range.

A rail vehicle can generally be understood to mean a railborne vehicle, such as a locomotive, a multiple unit, a railcar, a tram, a subway vehicle, a railway car such as a passenger car or railroad car and/or freight car or the like. An axial extent axis can be understood to be an axis which is followed, for example, by a drill through a wall, to produce the corresponding opening. Here, for example, the axial extent axis can have a substantially right-angled orientation onto a wall, in which the opening is provided. An axial extent axis of the first cable through opening can be the first axial extent axis. A cable through opening can be formed as a through opening in the housing device. Here, an inside diameter of a cable through opening can be greater than or equal to an external diameter of a connector cable. Here, the first cable through opening can be arranged in the center of the rail brake within a tolerance range, the tolerance range corresponding to a range of, for example, half or a quarter of the longitudinal extent of the rail brake about the center of the rail brake.

According to one embodiment, the housing device having a second cable through opening for leading through a second electrical connector cable into the magnet body, the second axial extent axis can be arranged at the acute inclination angle with regard to the main surface which is adjacent with respect to the first cable through opening and/or the second cable through opening. An axial extent axis of the second cable through opening can be the second axial extent axis. Here, the first axial extent axis and/or the second axial extent axis can be arranged at an acute inclination angle with regard to a main extent plane of the main surface. An embodiment of this type affords the advantage that an oblique cable leadthrough into the housing or the magnet body is achieved, which makes it possible to save installation space, in particular since exceeding of a permissible bending radius of the cable with regard to the main surface can be avoided.

The first axial extent axis and the second axial extent axis can also define an obtuse angle between one another. An embodiment of this type affords the advantage that a housing device can be provided which saves a particularly large amount of installation space.

Furthermore, the first cable through opening can be arranged in a first depression section of the housing device and/or the second cable through opening can be arranged in a second depression section of the housing device. Here, the first depression section and the second depression section can be formed, in particular, in a common main surface of the housing device. The common main surface can be a surface on a mounting side of the housing device. An embodiment of this type affords the advantage that installation space can be saved with regard to the electrical contact of the magnet body, by the cable through openings being arranged in a recessed manner with regard to the common main surface.

Here, the first depression section can have a wall which is inclined at an acute angle with regard to a main extent plane of the common main surface and in which the first cable through opening is formed. As an alternative or in addition, the second depression section can have a wall which is inclined at an acute angle with regard to the main extent plane of the common main surface and in which the second cable through opening is formed. Here, the first depression section and the second depression section can be formed as notch-shaped or notched depressions of the common main surface. Angles of the axial extent axes of the cable through openings with regard to the main extent plane of the common main surface can result in a manner which is dependent on inclination angles of the inclined walls of the depression sections. An embodiment of this type affords the advantage that depression sections in the form of notches can be formed in an uncomplicated manner A relationship between the inclination angles and the angles of the axial extent axes can also be advantageously utilized.

In particular, the first depression section and/or the second depression section can be arranged along a side edge of the common main surface. Here, the first depression section and the second depression section can be arranged in an edge section of the common main surface. Here, the first depression section can have one open side, and the second depression section can have one open side. As an alternative, the first depression section and/or the second depression section can be arranged transversely with regard to the side edge of the common main surface. An embodiment of this type affords the advantage that the depression sections are accessible for mounting purposes and cleaning purposes and are more resistant to contamination, it being possible, for example, for spray water to flow away out of the depression sections.

In addition, a first fastening device which is arranged adjacently with respect to the first cable through opening can be provided for fastening the first connector cable, and/or a second fastening device which is arranged adjacently with respect to the second cable through opening can be provided for fastening the second connector cable. Here, the first fastening device can be arranged so as to surround the first cable through opening, and/or the second fastening device can be arranged so as to surround the second cable through opening. An embodiment of this type affords the advantage that simple and space-saving fastening of the connector cables on the housing device can be realized.

Furthermore, one embodiment of the approach proposed here may have particular utility, in which the tolerance range corresponds to half the length of the rail brake, the tolerance range corresponding, in particular, to a quarter of the length of the rail brake. An embodiment of this type of the approach proposed here affords the additional utility of saving of installation space, since a course of the cable which runs through the cable through opening in the region of the suspension means of the rail brake can largely be avoided. This serves firstly to protect the cable against dirt or damage and secondly for the possibility of an extension of the magnet of the rail brake, which leads to an increased braking action of the rail brake as a consequence.

The disclosed embodiments of an electromagnetic or permanently magnetic rail brake for a rail vehicle may be distinguished by the fact that the rail brake may have at least one embodiment of the abovementioned housing device for a magnet body.

In conjunction with the electromagnetic or permanently magnetic rail brake, one embodiment of the abovementioned housing device can advantageously be applied or used, to optimize a protective effect for a magnet body in the case of a simplified and downsized construction. The electromagnetic or permanently magnetic rail brake can be what is known as an eddy current brake. The magnet body can be part of a rigid magnet or the like. The housing device, and therefore the electromagnetic or permanently magnetic rail brake, can be capable of being attached movably on the rail vehicle by means of a suspension device. The electromagnetic or permanently magnetic rail brake can have a plurality of magnet bodies with in each case one embodiment of the abovementioned housing device. According to at least one disclosed embodiment, identical or similar designations are used for the elements which are shown in the different drawings and act in a similar manner, a repeated description of the elements being omitted.

FIG. 1 shows an illustration of a housing device 100 for a magnet body for an electromagnetic rail brake. Here, FIG. 1 shows, of the housing device 100, a main surface 110, a first fastening device 120 and a second fastening device 130, and, furthermore, also a first electrical connector cable A and a second electrical connector cable B. In accordance with the embodiment of a housing device 100 which is shown in FIG. 1, the main surface 110 is a surface or mounting surface on the rail vehicle side which faces the rail vehicle in a mounted state of the housing device 100 or the electromagnetic rail brake on a rail vehicle.

In FIG. 1, housing openings which are concealed owing to the illustration for leading through the connector cables A and B are formed in the main surface 110 of the housing device 100. The first connector cable A and the second connector cable B are guided through the housing openings in the main surface 110 into the interior of the housing device 100. The first fastening device 120 is arranged on the main surface 110 such that it surrounds a first housing opening. The second fastening device 130 is arranged on the main surface 110 such that it surrounds a second housing opening.

Here, the first connector cable A is led through the first housing opening and is fastened to the housing device 100 by means of the first fastening device 120. The second connector cable B is led through the second housing opening and is fastened to the housing device 100 by means of the second fastening device 130. The first connector cable A and the second connector cable B are led through the housing openings in parallel with regard to one another and in each case at a right angle or orthogonally with regard to the main surface 110 of the housing device 100. A direct or integral embodiment of this type of cable entries can necessitate a disadvantageous limitation of an installation space.

Figure 2:
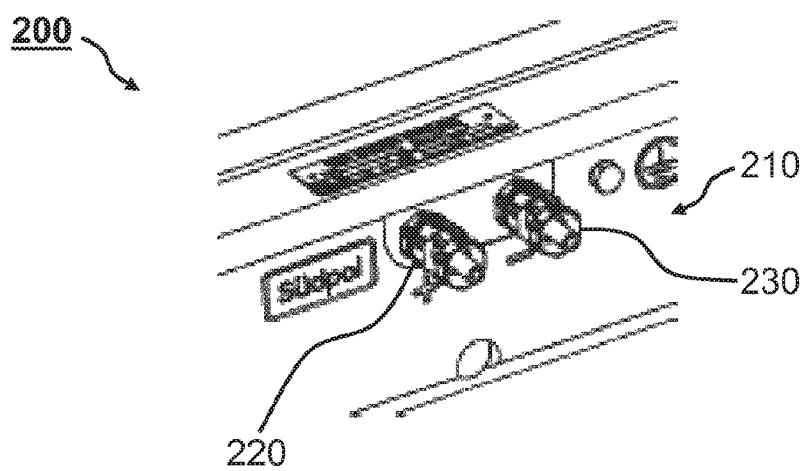

FIG. 2 shows an illustration of a housing device 200 for a magnet body for an electromagnetic rail brake. Here, FIG. 2 shows, of the housing device 200, a main surface 210, a first fastening device 220 and a second fastening device 230. In accordance with the embodiment of a housing device 200 which is shown in FIG. 2, the main surface 210 is a lateral surface which, in a mounted state of the housing device 200 or the electromagnetic rail brake on a rail vehicle, adjoins a mounting surface or a surface which faces the rail vehicle.

In FIG. 2, housing openings which are concealed owing to the illustration for leading through electrical connector cables are formed in the main surface 210 of the housing device 200. A first connector cable and a second connector cable can be led through the housing openings in the main surface 210 into the interior of the housing device 200. The first fastening device 220 is arranged on the main surface 210 such that it surrounds a first housing opening. The second fastening device 230 is arranged on the main surface 210 such that it surrounds a second housing opening.

Here, the first connector cable can be led through the first housing opening and can be fastened to the housing device 200 by means of the first fastening device 220. The second connector cable can be led through the second housing opening and can be fastened to the housing device 200 by means of the second fastening device 230. Here, the housing device 200 is configured in such a way that the first connector cable and the second connector cable can be led through the housing openings in parallel with regard to one another and in each case at a right angle or orthogonally with regard to the main surface 210 of the housing device 200. A direct or integral embodiment of this type of cable entries can necessitate a disadvantageous limitation of an installation space and can be arranged outside a protective area of a wheel track of the rail vehicle.

Figure 3:
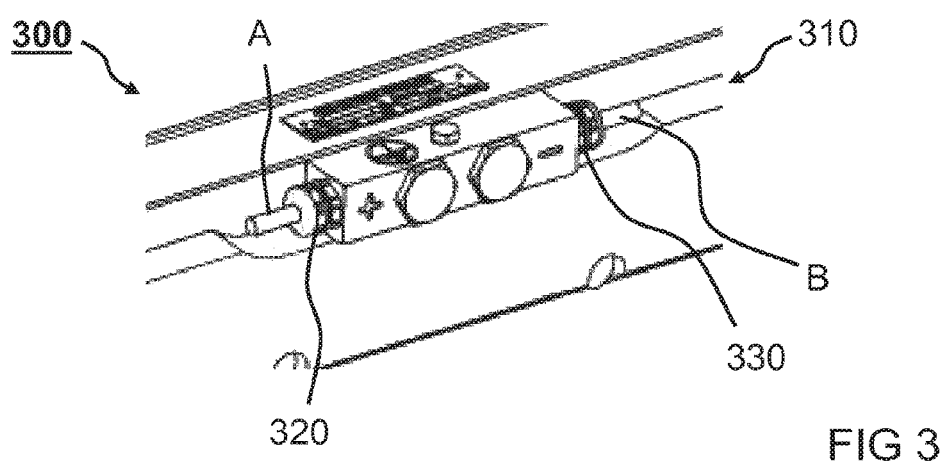

FIG. 3 shows an illustration of a housing device 300 for a magnet body for an electromagnetic rail brake. Here, FIG. 3 shows, of the housing device 300, a main surface 310, a first fastening device 320 and a second fastening device 330, and, furthermore, also a first electrical connector cable A and a second electrical connector cable B. In accordance with the embodiment of a housing device 300 which is shown in FIG. 3, the main surface 310 is a surface or mounting surface on the rail vehicle side which faces the rail vehicle in a mounted state of the housing device 300 or the electromagnetic rail brake on a rail vehicle.

In FIG. 3, housing openings which are concealed owing to the illustration for leading through the connector cables A and B are formed in the main surface 310 of the housing device 300. The first connector cable A and the second connector cable B are led through the housing openings in the main surface 310 into the interior of the housing device 300. The first fastening device 320 is arranged on the main surface 310 so as to surround a first housing opening. The second fastening device 330 is arranged on the main surface 310 so as to surround a second housing opening. Here, the housing openings and the fastening devices 320 and 330 are arranged on a cable branching flange. Here, an introduction of the connector cables A and B into the magnet body therefore takes place via a separately adapted cable branching flange.

Here, the first connector cable A is led through the first housing opening and is fastened to the housing device 300 by means of the first fastening device 320. The second connector cable B is led through the second housing opening and is fastened to the housing device 300 by means of the second fastening device 330. The first connector cable A and the second connector cable B are led through the housing openings axially or coaxially with regard to one another and in each case in parallel with regard to the main surface 110 of the housing device 100.

Figure 4:
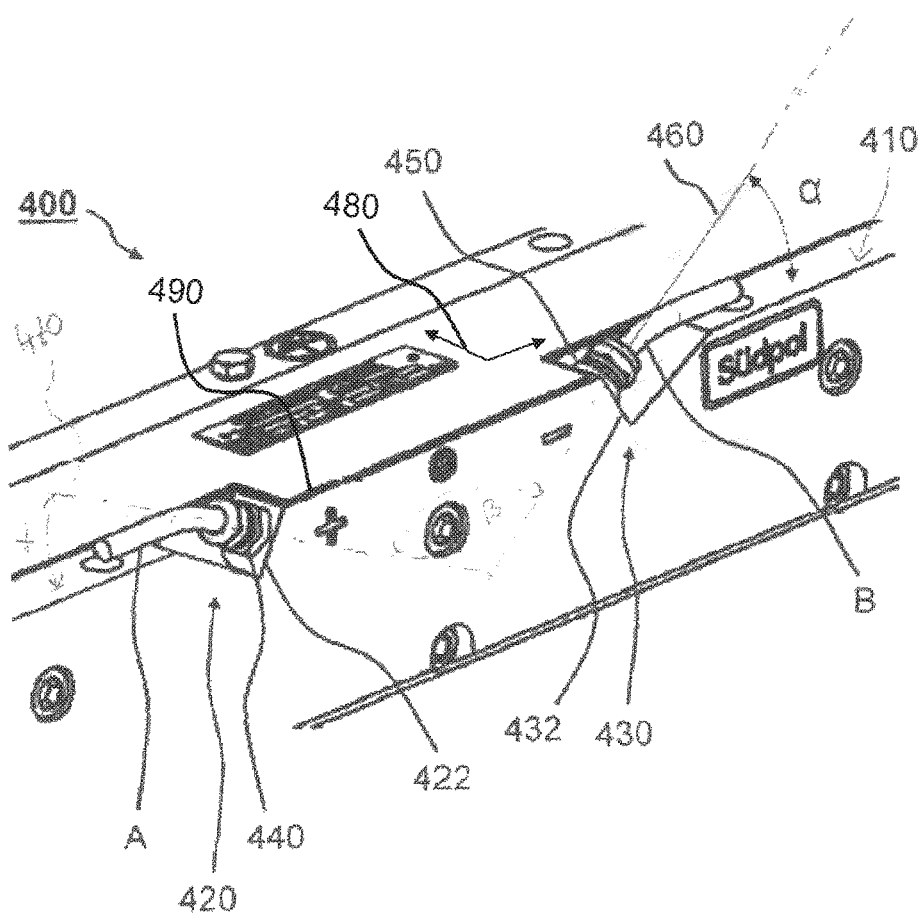
FIG. 4 shows an illustration of a housing device for a magnet body for an electromagnetic or permanently magnetic rail brake.

FIG. 4 shows an illustration of a housing device 400 for a magnet body for an electromagnetic rail brake for a rail vehicle in accordance with one of the disclosed embodiments. FIG. 4 shows, of the housing device 400, a main surface 410, a first depression section 420, an inclined wall 422 of the first depression section 420, a second depression section 430, an inclined wall 432 of the second depression section 430, a first fastening device 440, a second fastening device 450, a second axial extent axis 460, a first axial extent axis 470, a main extent plane 480 which is symbolized by two vector arrows, a side edge 490, an acute inclination angle $\alpha$, and an obtuse angle $\beta$ which is defined between the axial extent axes 460 and 470, and, furthermore, also a first electrical connector cable A and a second electrical connector cable B.

The housing device 400 is configured to accommodate the magnet body. Here, the electromagnetic rail brake has at least one magnet body which is surrounded by the housing device 400 or by in each case one housing device such as the housing device 400. The electromagnetic rail brake can be attached to the rail vehicle. The rail vehicle has, for example, a railborne vehicle, such as a locomotive, a multiple unit, a tram, a railroad car or the like.

According to at least one disclosed embodiment which is shown in FIG. 4, the main surface 410 is a surface or mounting surface on the rail vehicle side which, in a state of the housing device 400 or the electromagnetic rail brake in which it is mounted on the rail vehicle, faces the rail vehicle. The first depression section 420 and the second depression section 430 are formed in the main surface 410.

The first depression section 420 and the second depression section 430 are formed as notch-shaped or notched depressions of the main surface 410. Here, the first depression section 420 and the second depression section 430 are arranged along a side edge 490 of the main surface 410. Therefore, the first depression section 420 and the second depression section 430 are arranged in an edge section of the main surface 410. Here, the depression sections 420 and 430 have in each case one open side toward a side surface of the housing device 400, the side surface on the side edge 490 of the main surface 410 adjoining the main surface 410.

The first depression section 420 has the inclined wall 422 which is inclined at an acute angle with regard to a main extent plane 480 of the main surface 410. The second depression section 430 has the inclined wall 432 which is inclined at an acute angle with regard to the main extent plane 480 of the main surface 410. According to at least one disclosed embodiment which is shown in FIG. 4, the inclined walls 422 and 432 are arranged so as to face one another. The depression sections 420 and 430 also have in each case one further wall which is inclined at an acute angle with regard to the main extent plane 480 of the main surface 410, which walls are arranged so as to face away from one another.

Cable through openings which are concealed owing to the illustration in FIG. 4 for leading through the connector cables A and B into the interior of the housing device 400 are formed in the depression sections 420 and 430. Here, the housing device 400 has a first cable through opening for leading through the first electrical connector cable A into the magnet body and a second cable through opening for leading through the second electrical connector cable B into the magnet body.

More precisely, the cable through openings are formed in the inclined walls 422 and 432 of the depression sections 420 and 430. Here, the first cable through opening is arranged in the first depression section 420 of the housing device 400. The first cable through opening is formed in the inclined wall 422 of the first depression section 420 of the housing device 400. The second cable through opening is arranged in the second depression section 430 of the housing device 400. The second cable through opening is formed in the inclined wall 432 of the second depression section 430 of the housing device 400.

The cable through openings are formed as through openings of the housing device 400. Here, an inside diameter of a cable through opening is greater than or equal to an external diameter of a connector cable A or B. The first connector cable A and the second connector cable B are led through the cable through openings into the interior of the housing device 400.

Here, the first cable leadthrough is arranged in the center of the rail brake within a tolerance range. Here, a tolerance range in the center of the rail brake is to be understood to mean a range which extends, for example, on both sides around the center of the rail brake in a range which corresponds to a quarter of the overall length of the rail brake. In this way, the approach which is proposed here affords the advantage that the cables do not need to be led away on the end side from the magnet body or the rail brake. The closer the cable leadthrough is arranged to the center of the rail brake, the more flexibility can be achieved in the region of the outer edges of the rail brake, since consideration no longer needs to be taken of a cable which is otherwise to be routed at the points. In the case of the approach which is proposed here, in contrast, the cables leave the magnet on the upper side, which magnet forms, for example, the rail brake. This has the advantage that additional space does not need to be provided between the wheel and the magnet, to route away the cable, as is the case in the existing magnet, and the point to be sealed (cable screw connection) is not soiled by the wheel.

The first fastening device 440 is configured to fasten the first connector cable A to the housing device 400. Here, the first fastening device 440 is arranged on the inclined wall 422 of the first depression section 420 so as to surround the first cable through opening. The first connector cable A is fastened to the housing device 400 by means of the first fastening device 440. The second fastening device 450 is configured to fasten the second connector cable B to the housing device 400. Here, the second fastening device 450 is arranged on the inclined wall 432 of the second depression section 430 so as to surround the second cable through opening. The second connector cable B is fastened to the housing device 400 by means of the second fastening device 450.

The first cable through opening has the first axial extent axis 470, and the second cable through opening has the second axial extent axis 460. Here, cable leadthrough axes of the connector cables A and B through the cable through openings of the housing device 400 correspond to the axial extent axes 460 and 470 of the cable through openings.

Here, the first axial extent axis 470 and the second axial extent axis 460 are arranged at an acute inclination angle $\alpha$ with regard to the main extent plane 480 of the main surface 410. It can be seen in FIG. 4 that, according to at least one disclosed embodiment which is shown in FIG. 4, both axial extent axes 460 and 470 are arranged in each case at the same inclination angle $\alpha$ with regard to the main extent plane 480 of the main surface 410.

Therefore, the first axial extent axis 470 of the first cable through opening and the second axial extent axis 460 of the second cable through opening define an obtuse angle $\beta$ between one another. Here, the obtuse angle $\beta$ is 180 degrees minus twice the acute inclination angle $\alpha$.

The acute inclination angles $\alpha$ of the axial extent axes 460 and 470 of the cable through openings with regard to the main extent plane 480 of the main surface 410 and therefore also the obtuse angle $\beta$ which is defined between the axial extent axes 460 and 470 result in a manner which is dependent on inclination values of the inclined walls 422 and 432 of the depression sections 420 and 430. Here, the inclination values or angles of the inclined walls 422 and 432 of the depression sections 420 and 430 with regard to the main extent plane 480 of the main surface 410 represent corresponding angles to the acute inclination angles $\alpha$.

The first connector cable A extends along the first axial extent axis 470 in the region of the first cable through opening, has a curved section in a transition region between the first depression section 420 and the main surface 410, and extends along the main extent plane 480 of the main surface 410 in a further course. The second connector cable B extends along the second axial extent axis 460 in the region of the second cable through opening, has a curved section in a transition region between the second depression section 430 and the main surface 410, and extends along the main extent plane 480 of the main surface 410 in a further course.

In other words, FIG. 4 shows an introduction of the connector cables A and B in an oblique position directly into the magnet body. The oblique position of the cable entry is an optimization between that which is still mechanically feasible and minimizing of the installation space caused by a cable screw connection on the fastening devices 440 and 450 or other similar sealing elements and the connector cables A and B themselves and their minimum bending radii. The aim of the optimization is to keep the inclination angle $\alpha$ as low as possible, in order as far as possible to keep the components of the cable connectors, such as, for example, sealing elements and the connector cables themselves, within the magnet cross-sectional shadow of the electromagnetic rail brake. Here, in particular, the minimization of the inclination angle $\alpha$ is limited merely by way of tool-specific and mechanical conditions on account of a necessary bore for the cable through openings.

The exemplary embodiments which are described are selected merely by way of example and can be combined with one another.

In the case of an electromagnetic rail brake, a connector cable can be introduced, for example, via a separately adapted cable branching flange into a magnet body of the rail brake. DE 10 2004 018 010 B3 discloses a magnetic rail braking device of a rail vehicle.

LIST OF DESIGNATIONS

100 Housing device
110 Main surface
120 First fastening device
130 Second fastening device
A First electrical connector cable
B Second electrical connector cable
200 Housing device
210 Main surface
220 First fastening device
230 Second fastening device
300 Housing device 310 Main surface
320 First fastening device
330 Second fastening device
400 Housing device
410 Main surface
420 First depression section
422 Inclined wall
430 Second depression section
432 Inclined wall
440 First fastening device
450 Second fastening device
460 Second axial extent axis
470 First axial extent axis
480 Main extent plane
490 Side edge
α Acute inclination angle
β Obtuse angle (defined between the axial extent axes)

The invention claimed is:

1. A housing device for a magnet body for an electromagnetic or permanently magnetic rail brake for a rail vehicle, the housing device comprising:
a first cable through opening for leading through a first electrical connector cable (A) into the magnet body, wherein a first axial extent axis of the first cable through opening is arranged at an acute inclination angle (α) with regard to a main surface of the housing device, which is adjacent with respect to the first cable through opening, and
wherein the first cable through opening is arranged in the center of the rail brake within a tolerance range.

2. The housing device of claim 1, further comprising: a second cable through opening for leading through a second electrical connector cable (B) into the magnet body, wherein the second axial extent axis is arranged at the acute inclination angle (α) with regard to the main surface, which is adjacent with respect to the first cable through opening and/or the second cable through opening.

3. The housing device of claim 2, wherein the first axial extent axis and the second axial extent axis define an obtuse angle (β) between one another.

4. The housing device of claim 1, wherein the first cable through opening is arranged in a first depression section of the housing device and/or the second cable through opening is arranged in a second depression section of the housing device, the first depression section and the second depression section being formed in a common main surface of the housing device.

5. The housing device of claim 4, wherein the first depression section has a wall which is inclined at an acute angle with regard to a main extent plane of the common main surface and in which the first cable through opening is formed, and/or the second depression section has a wall which is inclined at an acute angle with regard to the main extent plane of the common main surface and in which the second cable through opening is formed.

6. The housing device as claimed in claim 4, wherein the first depression section and/or the second depression section are/is arranged along a side edge of the common main surface.

7. The housing device as claimed in claim 1, wherein a first fastening device, which is arranged adjacently with respect to the first cable through opening for fastening the first connector cable (A), and/or a second fastening device which is arranged adjacently with respect to the second cable through opening for fastening the second connector cable (B).

8. The housing device as claimed in claim 1, wherein the tolerance range corresponds to half the length of the rail brake.

9. An electromagnetic or permanently magnetic rail brake for a rail vehicle, the rail brake comprising: at least one housing device for a magnet body the at least one housing device having a first cable through opening for leading through a first electrical connector cable (A) into the magnet body, wherein a first axial extent axis of the first cable through opening is arranged at an acute inclination angle (α) with regard to a main surface of the housing device, which is adjacent with respect to the first cable through opening, and
wherein the first cable through opening is arranged in the center of the rail brake within a tolerance range.

10. The housing device of claim 5, wherein the first depression section and/or the second depression section are/is arranged along a side edge of the common main surface.

11. The housing device of claim 1, wherein the tolerance range corresponds to a quarter of the length of the rail brake.

* * * * *